(12) United States Patent
Koller et al.

(10) Patent No.: US 12,483,179 B2
(45) Date of Patent: Nov. 25, 2025

(54) METHODS AND CIRCUITS FOR CROSS CONDUCTION PROTECTION IN AN ELECTRIC MOTOR

(71) Applicant: Regal Beloit America, Inc., Beloit, WI (US)

(72) Inventors: Michael R. Koller, Columbia City, IN (US); Ludovic Andre Chretien, Columbia City, IN (US)

(73) Assignee: Regal Beloit America, Inc., Milwaukee, WI (US)

( * ) Notice: Subject to any disclaimer, the term of this patent is extended or adjusted under 35 U.S.C. 154(b) by 118 days.

(21) Appl. No.: 18/320,612

(22) Filed: May 19, 2023

(65) Prior Publication Data

US 2024/0388236 A1 Nov. 21, 2024

(51) Int. Cl.
*H02P 1/42* (2006.01)
*H02P 29/032* (2016.01)

(52) U.S. Cl.
CPC ........ *H02P 29/032* (2016.02); *H02P 2207/01* (2013.01); *H02P 2207/05* (2013.01)

(58) Field of Classification Search
CPC .... H02P 25/18; H02P 29/024; H02P 2209/01; H02P 5/74; H02P 6/16; H02P 6/182; H02P 21/05; H02P 6/185; H02P 6/28; H02P 21/09; H02P 21/16; H02P 21/22; H02P 25/092; H02P 25/098; H02P 27/085; H02P 29/68
See application file for complete search history.

(56) References Cited

U.S. PATENT DOCUMENTS

| | | |
|---|---|---|
| 3,710,218 A | 1/1973 | Roundy |
| 3,845,372 A | 10/1974 | Geiersbach |
| 4,190,793 A | 2/1980 | Parker |
| 4,254,349 A | 3/1981 | Bocharov |
| 4,271,367 A | 6/1981 | Popov |
| 4,482,853 A | 11/1984 | Bhavsar |
| 5,276,392 A | 1/1994 | Beckerman |
| 5,483,111 A | 1/1996 | Kuznetsov |
| 5,585,709 A | 12/1996 | Jansen |
| 5,668,421 A | 9/1997 | Gladish |
| 5,796,194 A | 8/1998 | Archer |
| 6,278,194 B1 | 8/2001 | Nakagawa |
| 9,431,931 B2 | 8/2016 | Zhou |
| 11,081,984 B2 | 8/2021 | Gabrys |

(Continued)

*Primary Examiner* — Kawing Chan
*Assistant Examiner* — Charles S Laughlin
(74) *Attorney, Agent, or Firm* — Armstrong Teasdale LLP

(57) ABSTRACT

A system including an electric motor of a compressor system and a controller is disclosed. The electric motor includes a switch configured to provide line frequency power to the electric motor to drive the electric motor at a full speed, and an inverter to provide variable frequency power to the electric motor to drive the electric motor at a variable speed. The controller is configured to determine whether the switch is closed in response to powering up the electric motor and before supplying the variable frequency power to the electric motor from the inverter. The controller is configured to prevent supply of the variable frequency power to the electric motor from the inverter to prevent damage to the inverter based on the determining that the switch is closed and generate an alert notification to notify a user of a fault in the switch.

17 Claims, 12 Drawing Sheets

(56) References Cited

U.S. PATENT DOCUMENTS

2003/0006749 A1   1/2003  Rollman
2018/0269810 A1*  9/2018  Chretien ................. H02P 1/445
2020/0057424 A1   2/2020  Steinbach
2024/0271813 A1*  8/2024  Brasuell ................... F24F 11/46

\* cited by examiner

METHODS AND CIRCUITS FOR CROSS CONDUCTION PROTECTION IN AN ELECTRIC MOTOR

FIELD

The field of the disclosure generally relates to methods and circuits for cross conduction protection in electric motors, and in particular, a permanent split capacitor (PSC) motor and/or a permanent magnet (PM) electric motor for compressor systems.

BACKGROUND

Some induction motors (electric motors) may be driven with a variable speed motor controller to adapt motor speed or torque output to a load level. A drive circuit for such induction motors enables efficient operation at both high and low load conditions. For example, a motor operating a compressor in a heating, ventilation, and air conditioning (HVAC) system may experience high load conditions during peak temperatures and low load conditions during milder temperatures. At least some drive circuits operate the motor using an inverter under low load conditions and operates the motor using line frequency power under high load conditions.

The motor generally operates within a 15 to 40 Hz frequency when being operated using power from the inverter, and at 60 Hz frequency when being operated using power from alternating current (AC) input power. Switching between the power from the inverter and the AC input power is performed by a two-pole mechanical contactor (or a contactor or a switch), which is wired in parallel to the inverter. The contactor includes a coil that is generally controlled by a coil control switch. The coil when energized causes closing of the contactor. Accordingly, switching of the inverter when one or more legs of the two-pole mechanical contactor are closed (or shorted), and/or a shorted coil control switch causing the contactor to close, may damage the inverter.

BRIEF DESCRIPTION

In one aspect, system including an electric motor of a compressor system and a controller is disclosed. The electric motor includes a contactor configured to provide line frequency power to the electric motor to drive the electric motor at a full speed, and an inverter to provide variable frequency power to the electric to drive the electric motor at a variable low speed. The controller is configured to determine whether the contactor is closed in response to powering up the electric motor and before supplying the variable frequency power to the electric motor from some sections of the inverter. The controller is configured to prevent supply of the variable frequency power to the electric motor from some sections of the inverter to prevent damage to the inverter based on the determining that the contactor is closed and generate an alert notification to notify a user of a fault in the contactor.

In another aspect, a controller of an electric motor is disclosed. The controller is configured to determine whether a contactor of the electric motor is closed when the electric motor is powered up and before supplying variable frequency power of an inverter of the electric motor to drive the electric motor. The controller is configured to, based on the determining that the contactor is closed, prevent supplying the variable frequency power to the electric motor from the inverter to prevent damage to the inverter, and generate an alert notification to notify a user of a fault in the contactor.

In yet another aspect, a method to prevent cross conduction in an electric motor is disclosed. The method includes determining whether a contactor of the electric motor is closed when the electric motor is powered up and before supplying variable frequency power of an inverter of the electric motor to drive the electric motor. The method includes, based on the determining that the contactor is closed, preventing the inverter from supplying the variable frequency power to the electric motor. The method includes, based on the determining that the contactor is not closed, causing the inverter to supply the variable frequency power to the electric motor, monitoring a state corresponding to a coil control switch of the contactor, and based on the determining that the state corresponding to the coil control switch of the contactor indicating a shorted coil control switch, preventing the inverter from supplying the variable frequency power to the electric motor.

DETAILED DESCRIPTION

Figure 1:
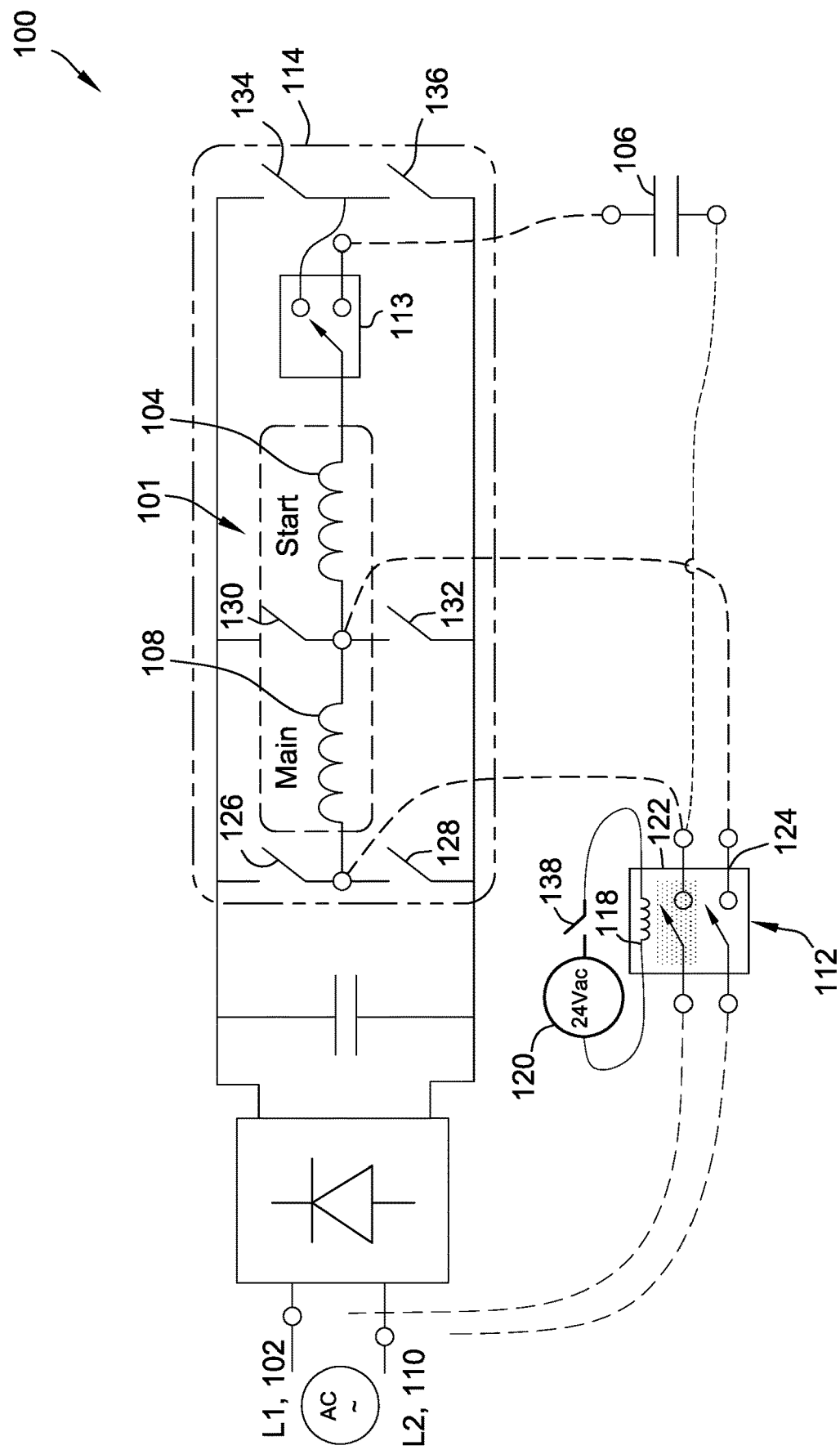
FIG. 1 is a schematic diagram of a known drive circuit for an electric motor.

When starting a compressor, the load on the electric motor is generally low and builds over time as suction and discharge pressures increase the torque demand on the electric motor. The torque output of the electric motor operating on line frequency power generally exceeds the starting load of the compressor, when pressures are near equal. However, if the load, i.e., the torque demand, exceeds the torque output from the electric motor, the electric motor cannot accelerate and instead decelerates, or "stalls." For example, the electric motor cannot start if stopped, i.e., is locked; or decelerates if turning under power, i.e., stalls. This can occur after the compressor operates for a period of time to build suction and discharge pressures, creating a pressure differential across the compressor and resulting in a large torque demand. The large torque demand, i.e., large load, can generally be met if the electric motor is already turning under power; however, if the drive circuit for the electric motor has limited power output, for example, in a variable speed drive, then the electric motor may stall and decelerate when the load exceeds the maximum power output of the drive circuit. If the electric motor is stopped, the starting torque output may not overcome the load and the rotor would remain locked until the pressure differential dissipates.

In compressor systems utilizing a hybrid drive (i.e., where the electric motor is supplied power through an inverter under low load conditions and supplied line frequency power under high load conditions), torque demand, or load, can exceed the power output capacity of the inverter or the torque output of the electric motor near the transition point. Generally, the inverter and line frequency power cannot both be connected to the electric motor at the same time, because of the potential for a line-to-line short circuit due to cross conduction as a two-pole mechanical contactor (or a contactor or a switch) is connected (or wired) in parallel to the inverter. In some examples, the contactor or the switch may be a mechanical switch, or an electrical or electronic switch (e.g., a solid-state relay). To transition from inverter to line, or line to inverter, one is disconnected before connecting the other. In other words, an inverter cannot be switched on when one or more legs of the contactor are also closed (shorted) due to a fault, for example, a mechanical fault, part of a mechanical movement of the contactor being stuck, and/or an excessive current through contacts of the contactor exceeding several times above a capacity of the contactor causing sintering of the static contacts of the contactor, and so on.

The drive circuit is configured to start a motor initially using variable frequency current from the inverter as the load requirements are low initially, and later on run the motor at full speed using the line frequency power. Transition from the variable frequency current from the inverter to the line frequency power occurs as a drive circuit communicates with at least one controller (e.g., a motor controller, a system controller, etc.) configured to dynamically determine when the drive circuit should transition from supplying variable frequency current from the inverter to supplying line frequency current such, and vice versa, that the electric motor is in constant operation through the transition (e.g., no restart is required). However, as stated herein if one or more legs of a contactor are shorted (or closed), an electric current flowing from the line frequency power input source through one or more shorted legs of the contactor may cause cross conduction (or short circuit) of the inverter, which is connected (or wired) in parallel to the contactor, causing damage to the inverter.

Accordingly, in some embodiments, when a motor is started, a controller may determine whether one or more legs of the contactor, and/or a coil control switch of the contactor are shorted (or closed) before switching the inverter on (or in other words, providing variable frequency power output from some sections of the inverter) when the motor load requirement is low.

In some embodiments, a motor may include one or more motor windings. By way of a non-limiting example, the one or more motor windings may include a first motor winding, e.g., a start winding, and a second motor winding, e.g., a main winding. Each motor winding of the one or more motor windings may have a respective inverter leg. In order to determine whether one or more legs of the contactor are shorted (before switching on the inverter) the controller may energize at least one switch of an inverter leg of the start winding for a predetermined short period, and measure or detect flow of an electrical current using a sensor (e.g., an Iac sensor which may be a current transformer, a hall-effect current sensor, and so on) placed in an electrical path between the line frequency input power and the contactor (or before the contactor). As described herein, if one or more legs of the contactor are not shorted, then when the at least one switch of the inverter leg of the start winding is energized, an electric current may not flow and hence no flow of an electric current may be detected by the Iac sensor. Accordingly, based on the detected or measured flow of electrical current using the Iac sensor, the controller may determine one or more legs of the contactor are shorted, and prevent switching of the inverter to start the motor. By way of a non-limiting example, the Iac sensor may be placed in the electrical path after the contactor, in a positive supply rail of the inverter, and/or in a negative supply rail of the inverter. Further, one or more impedances of certain values may be added in the inverter leg of the start winding to provide an additional protection to the inverter during testing of one or more shorted legs of the contactor.

Alternatively, in some embodiments, whether both legs of the contactor are shorted (before switching on the inverter) may be verified by the controller without energizing any switch of the inverter leg of the start winding, and by measuring or detecting flow of an electrical current using the Iac sensor placed in the electrical path before or after the contactor. As described herein, if both legs of the contactor are shorted, then an electric current may flow through the contactor and the main winding and may be measured or detected by the Iac sensor. Accordingly, based on the detected or measured flow of electrical current using the Iac sensor, the controller may determine that at least one leg of the contact is shorted, and prevent switching of the inverter to start the motor.

In some embodiments, and by way of a non-limiting example, during power-up, at least one switch of an inverter leg of the start winding may be energized for a predetermined short period, which may be a few seconds, for example, 2 seconds, 1 second, or 500 milliseconds (ms), and so on. For the predetermined short period from the power-up, the inverter may not be allowed to start (or supply variable frequency power to the electric motor) to prevent damage to the inverter, and, in particular, to prevent damage to some sections (or phases) of the inverter having their outputs directly connected to the contactor. By way of a non-limiting example, an alert notification may be generated to notify a user of a fault in the contactor. The alert notification may be turning a red light on an alarm panel or sending an alarm notification to a user interface on which various alarms are monitored. Additionally, or alternatively, one or more impedances of certain values may also be added in the inverter leg of the start winding and/or main winding to provide an additional protection to the inverter while checking whether one or more legs of the contactor are shorted or not.

As described herein, while a load on the motor may be low initially, and hence the motor may be started using the variable frequency inverter output, as the load of the motor increases and/or an operating speed of the inverter reaches near to a maximum operating speed of the inverter, the controller may control the drive circuit to transition to supplying line frequency current before the maximum operating speed of the inverter is reached. The drive circuits, motor controller, and system controller may be separate circuitry or combined circuitry. For transitioning to supply the line frequency current, a coil control switch of the contactor is closed to close (or shorten) both legs of the contactor, and inverted output power may be disconnected. However, if the coil control switch of the contactor is shorted or closed for some reason, then the coil of the contactor may be energized and both legs of the contactor may be shorted (which may be detected, as described herein, using the Iac sensor, and protective actions may be taken).

However, while the drive circuit is providing an inverter output to run the motor, the coil control switch may suddenly close (or short circuit) and energize both legs of the contactor. As described herein, when both legs of the contactor are closed, the inverter cannot be switched on (to provide the inverter output power) to run the motor as it may damage the inverter. Accordingly, a state of the coil control switch (in particular, the closed state the coil control switch) may need to be (continuously or dynamically) monitored while the inverter is switched on.

In some embodiments, the coil control switch (which is an electronic switch) may be a Triac switch (or an Opto-Triac switch) connected in series with a contactor coil to open and close the contactor. The Triac is in an off state, unless the contactor coil needs to be energized to close the contactor, and to run the motor using the line frequency A/C input power. Accordingly, for the correct operation of the motor, presence of the 24 Vac input needs to be monitored, and an unintended energizing of the contactor coil (e.g., due to shorted Triac switch) also needs to be monitored. By way of a non-limiting example, multiple Zener diodes (e.g., at least two Zener diodes) connected back-to-back in series and having some resistor network and an optoisolator may be wired to receive 24 Vac signal. The optoisolator may generate a signal of a particular waveform (e.g., a pulse waveform of a certain amplitude and frequency) as long as 24 Vac input signal is present and the Triac switch is not unintentionally closed/shorted (referenced herein as normal conditions). However, when the Triac switch fails (in other words unintentionally closes/shortens) causing the contactor coil to get energized, an additional resistor network through which an electric current may only flow when the Triac switch is closed/shorted may be used to generate an optoisolator signal of a different waveform from the particular waveform that is generated under the normal conditions. Accordingly, when the controller detects that the optoisolator signal is different from the particular waveform under normal conditions while the controller has not expected (as the controller has not closed the Triac switch), fault in the coil control switch may be detected and a preventive action may be taken to avoid damage to the inverter. As described herein, a single optoisolator is used to detect presence of the 24 Vac signal and an unintentionally shorted Triac switch.

Additionally, or alternatively, in some embodiments, a separate optoisolator may be used to detect an unintentionally shorted Triac switch, which may avoid comparing of the optoisolator signal waveform to detect the unintentionally shorted Triac switch. Additionally, or alternatively, in some embodiments, circuitry may be added to artificially generate a zero-crossing signal waveform that is distinguishable from the particular waveform generated under the normal conditions.

In some embodiments, alone or in combination with one or more of the above embodiments, the motor controller, system controller, or other remote device, while operating the electric motor and compressor under variable frequency power for a partial load, may determine if one or more legs of the contactor are closed/shorted, and/or a coil control switch is shorted during power-up of the motor and/or while the motor is being operated using the line frequency current power.

In some embodiments, a motor as described herein may be an induction motor, a permanent split capacitor (PSC) motor, and/or a multi-phase permanent magnet (PM) motor, and so on.

Various embodiments are described with respect to FIG. 1 to FIG. 11 below.

FIG. 1 is a schematic diagram of a known drive circuit 100 for an electric motor 101, such as a PSC motor. During normal line frequency operation, line frequency current, such as 50 Hertz or 60 Hertz, for example, is supplied on a first line, or L1, 102, through a run capacitor 106, to a start winding 104, and to a main winding 108. A second line, or L2, 110 provides a return, or neutral, for the line frequency current. The drive circuit 100 includes a contactor 112 for connecting and disconnecting the L1 102 and the L2 110 to the electric motor 101. The contactor 112 is a two-pole mechanical contactor that is commutated by energizing a coil 118 connected to a 24 Vac power supply 120 via a coil control switch 138 connected in series with the coil 118 and the 24 Vac power supply 120. In certain embodiments, the run capacitor 106 may be coupled to the L1 102 on either side of the contactor 112. A relay 113 is coupled between run capacitor 106 and start winding 104.

The drive circuit 100 includes an inverter 114 that is enabled to drive the electric motor 101 with variable frequency power under low load, or at least less than full load, conditions. The drive circuit 100 is supplied line frequency power on the L1 102 and the L2 110. The inverter 114 enables variable speed operation of the electric motor 101 by regulating an amplitude, a phase, and a frequency of alternating current (AC) voltages on output terminals thereof, which are coupled to the main winding 108 and the start winding 104. When operating the electric motor 101 using the inverter 114, the contactor 112 is opened and the inverter 114 is enabled via any suitable control means, e.g., an analog and/or a digital control signal. To transition to line frequency power, the inverter 114 is disabled, the contactor 112 is closed, and the relay 113 is commutated to couple the L1 102 and the L2 110 directly to the electric motor 101.

As shown in FIG. 1, the drive circuit 100 includes six wired connections, the contactor 112, and the run capacitor 106. These components contribute to a relatively high cost and complexity of the drive circuit 100. Moreover, the electric motor 101 includes integrated winding connections. In particular, the winding connections between the drive circuit 100 and the windings 104, 108 are integrated or tied, such that at least one connection is coupled to both of the main winding 108 and the start winding 104. Although, the electric motor 101 is illustrated as a PSC motor, it is recognized that the electric motor 101 can be a permanent magnet (PM) motor or an electronically commutated motor (ECM) having integrated windings (e.g., between windings of a three-phase ECM).

The contactor 112, which is a two-pole mechanical contactor, includes two legs, a first leg 122 and a second leg 124. As described herein, when operating the electric motor 101 using the inverter 114, the contactor 112 is opened (in other words, the first leg 122 and the second leg 124 are opened) and the inverter 114 is enabled using switches 126, 128, 130, 132, 134, and 136, via any suitable control means, e.g., an analog and/or a digital control signal. To transition to line frequency power, the inverter 114 is disabled using the switches 126, 128, 130, 132, 134, and 136, the contactor 112 is closed (in other words, the first leg 122 and the second 124 are closed), and the relay 113 is commutated to couple the L1 102 and the L2 110 directly to the electric motor 101.

Further, as described herein, while the electric motor 101 is being operated on the inverter 114, the contactor 112 needs to be opened to prevent damage to the inverter 114 from cross conduction from the first leg 122 and/or the second leg 124 being closed/shorted. Also, the coil control switch 138 when closed causes the coil 118 to energize, which causes the first leg 122 and the second leg 124 to close. Accordingly, while the electric motor 101 is being operated on the inverter 114, whether the coil control switch is closed or opened needs to be dynamically (and/or periodically) checked to prevent damage to the inverter 114 from cross conduction from the closed contactor 112 and the enabled inverter 114 at the same time.

In some embodiments, and by way of a non-limiting example, the drive circuit 100 may include an electromagnetic interference (EMI) filter (not shown) connected between an AC power supply and a rectifier providing power supply to the inverter 114. Inputs to the contactor 112 may be on either side of the EMI filter.

Figure 2A:
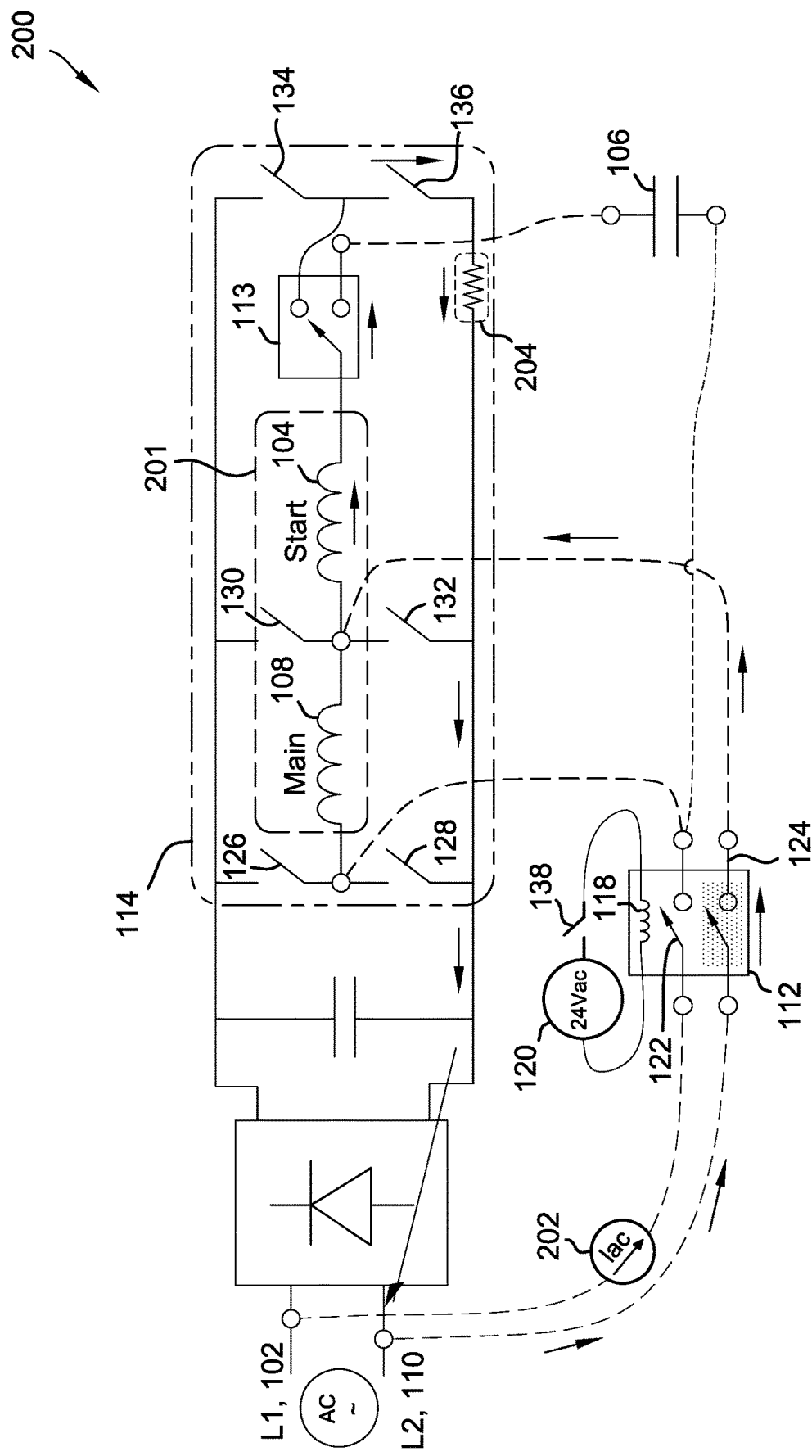
FIG. 2A is a schematic diagram of an exemplary drive circuit to detect whether one or more legs of a contactor are shorted/closed while an electric motor is powered-up, in accordance with the present disclosure.

FIG. 2A is a schematic diagram of an exemplary drive circuit 200 to detect whether one or more legs of a contactor are shorted/closed while an electric motor is powered-up, in accordance with some embodiments as described herein. FIG. 2A shows a drive circuit 200 configured to drive an electric motor 201 (e.g., an induction motor, a PSC motor, a PM motor, and so on). During normal line frequency operation, the drive circuit 200 supplies line frequency current, e.g., 50 Hz or 60 Hz, on the first line, or L1, 102, through the run capacitor 106, to the start winding 104, and to the main winding 108. The second line, or L2, provides a return, or neutral, for the line frequency current. The drive circuit 200 includes the contactor 112 including the coil 118 connected to the 24 Vac power supply 120 via the coil control switch 138 connected in series with the coil 118 and the 24 Vac power supply 120. The drive circuit may also include the run capacitor 106, the relay 113, the inverter 114, the first leg 122 and the second leg 124 of the contactor 112, switches 126, 128, 130, 132, 134, and 136, as described herein using FIG. 1. The drive circuit 200 includes a sensor, such as an Iac sensor, 202, which measures or detects flow of an electric current. The Iac sensor 202 may be placed before the contactor 112, as shown in FIG. 2A. Alternatively, the Iac sensor 202 may be placed after the contactor 112.

As described herein, during power-up of the electric motor 201 and while the inverter 114 is not yet started, when at least one of the switch 134 and the switch 136 is energized for a predetermined short period (e.g., 2 seconds, 1 second, or 500 ms), if the first leg 122 and/or the second leg 124 of the contactor 112 are shorted (or closed), an electric current may flow through the start winding 104 and may be measured using the Iac sensor 202. A resistive network, or an impedance network, 204 and a sensor (not shown) may be added to a start winding inverter leg 206 (or a third leg of the inverter 114) to measure the electric current flowing through the inverter 114 (and the start winding 104) when at least one of the switch 134 and the switch 136 is energized for the predetermined short period when the first leg 122 and/or the second leg 124 are shorted. In some embodiments, the impedance network 204 may be part of the sensor (not shown) that measures the electric current flowing through the inverter 114. Further, when the at least one of the switch 134 and the switch 136 is energized for the predetermined short period to determine whether the first leg 122 and/or the second leg 124 are shorted, a duty cycle of the switch 134 and/or the switch 136 is set to a value that is safe to not cause damage to the inverter. Accordingly, based on the detected or measured flow of electrical current using the Iac sensor 202 and/or the impedance network 204, a controller (not shown) may determine one or more legs of the contactor, e.g., the first leg 122 and/or the second leg 124, are shorted, and prevent switching of the inverter 114 to start the motor 201.

Figure 2B:
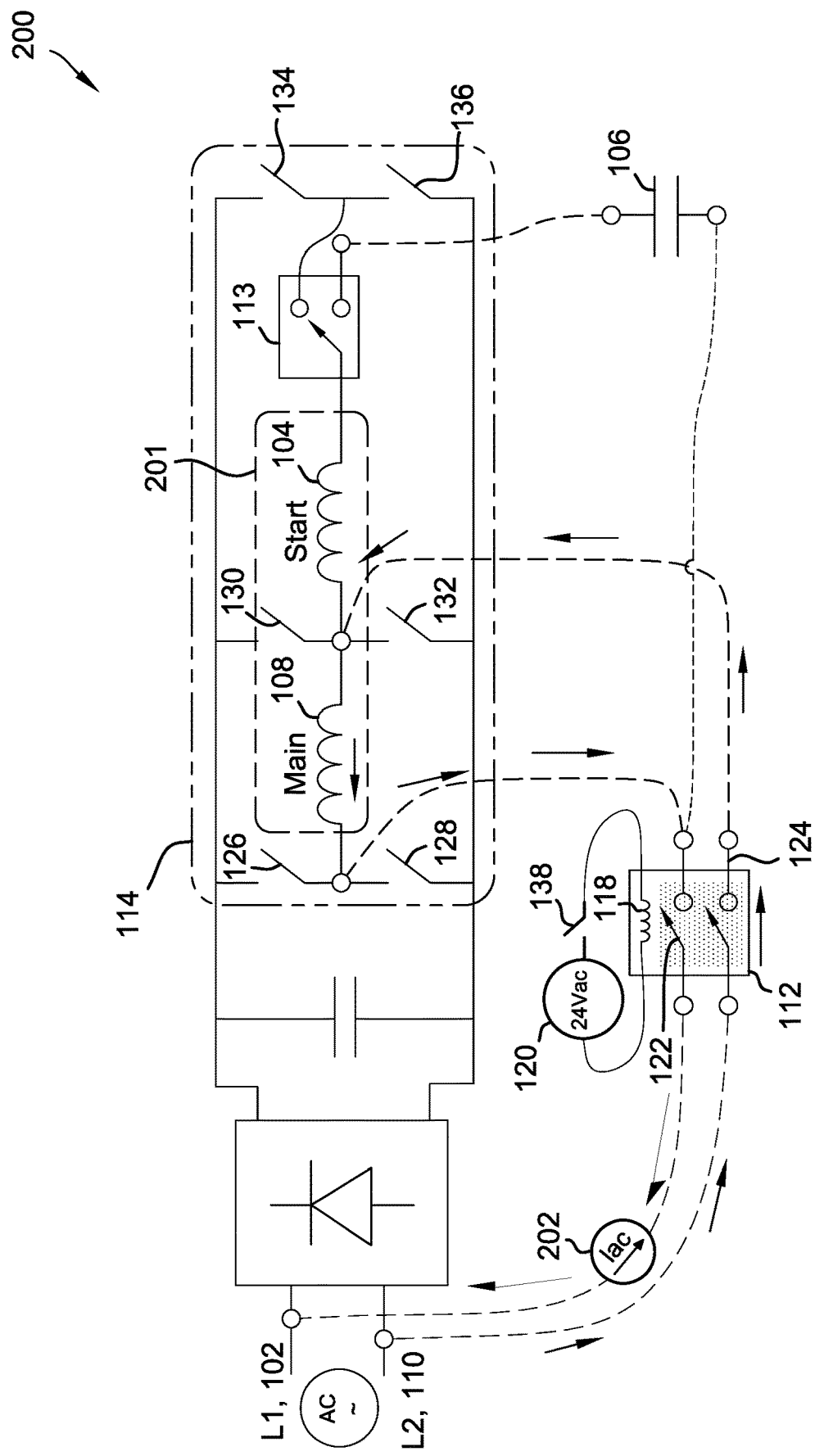
FIG. 2B is a schematic diagram of an exemplary drive circuit to detect whether both legs of a contactor are shorted/closed while an electric motor is powered-up, in accordance with the present disclosure.

FIG. 2B is a schematic diagram of an exemplary drive circuit 200 to detect whether both legs of a contactor are shorted/closed while an electric motor is powered-up, in accordance with some embodiments as described herein. As shown in FIG. 2A, when at least one of the switch 122 or the switch 124 is shorted/closed, an electric current may flow through the start winding 104, which may be measured using the Iac sensor 202 to detect the shorted switch 122 or 124. However, as shown in FIG. 2B, when the first leg 122 and the second leg 124 both are shorted/closed, an electric current may flow through the main winding 108, which may be measured or detected using the Iac sensor 202. Accordingly, a condition in which both of first leg 122 and the second 124 are shorted may be detected without energizing the switch 134 or the switch 136, and the controller may prevent switching of the inverter 114 to start the motor 201.

Figure 3:
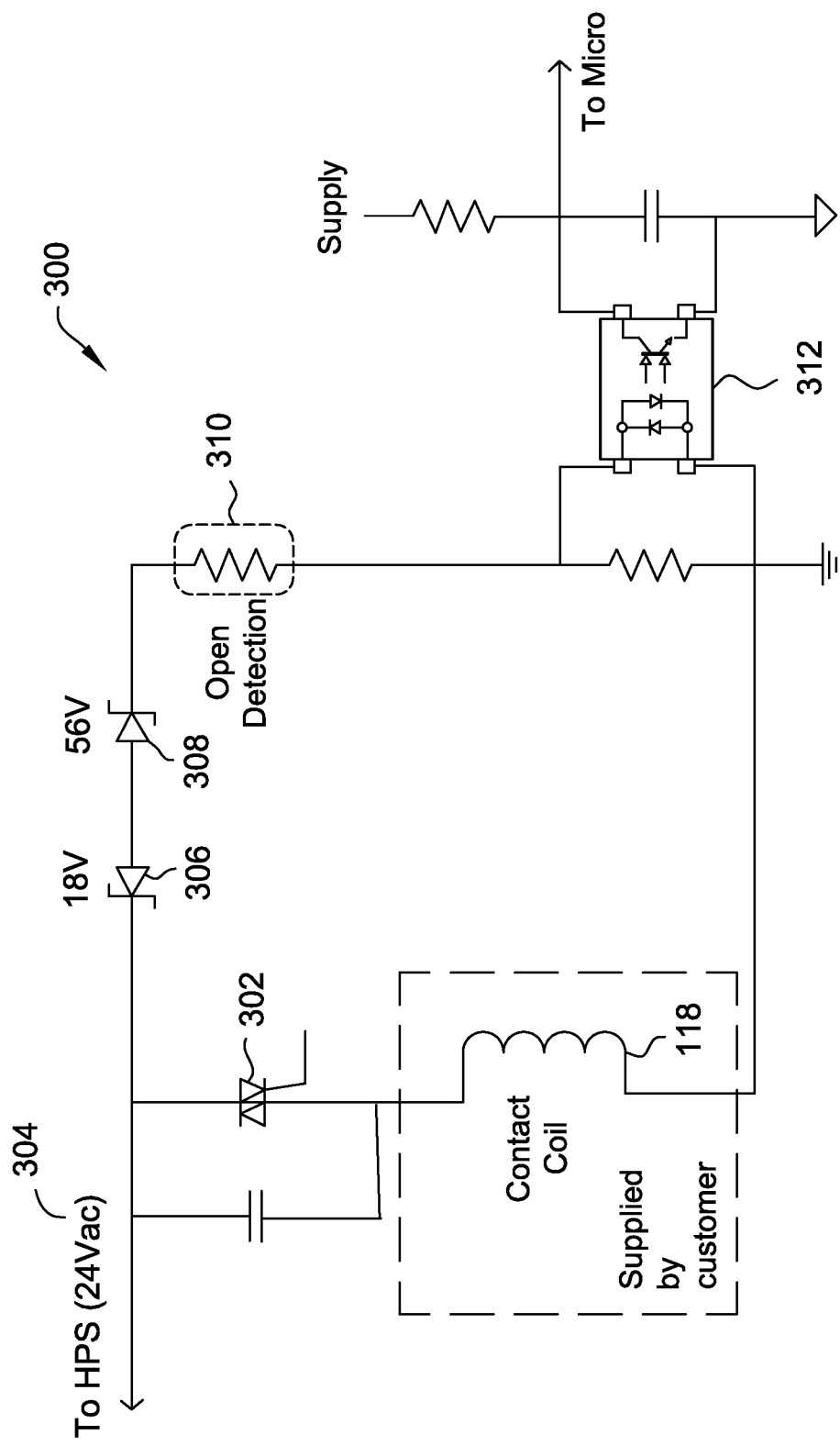
FIG. 3 is a schematic diagram of a known coil control switch of an electric motor.

FIG. 3 is a schematic diagram 300 of a known coil control switch such as the coil control switch 138 of the contactor 112 of the electric motor 101. As shown in FIG. 3, the coil control switch 138 (which is an electronic switch) may be a Triac switch (or an Opto-Triac switch) 302 connected in series with a contactor coil 118 to open and close the contactor 112. The Triac switch 302 is in an off state, unless the contactor coil 118 needs to be energized to close the contactor 112, and to run the motor 101 using the line frequency A/C input power. Accordingly, for the correct operation of the motor 101, presence of the 24 Vac input 304 needs to be monitored. By way of a non-limiting example, multiple Zener diodes (e.g., at least two Zener diodes 306 and 308) connected back-to-back in series and having some resistor network 310 and an optoisolator 312 may be wired to receive a signal for 24 Vac input 304. The optoisolator 312 may generate a signal of a particular waveform, which is described using FIG. 5 below, as long as 24 Vac input 304 is present and the Triac switch 302 is not closed/shorted. The signal generated by the optoisolator 312 may be a pulse waveform of a certain amplitude and frequency and provided as an input signal to a controller (not shown). Based on the presence of the pulse waveform, the controller may determine that 24 Vac input 304 is available. In some embodiments, the resistor network 310 and the optoisolator 312 may be circuitry that is separate from the coil control switch 138.

Figure 4:
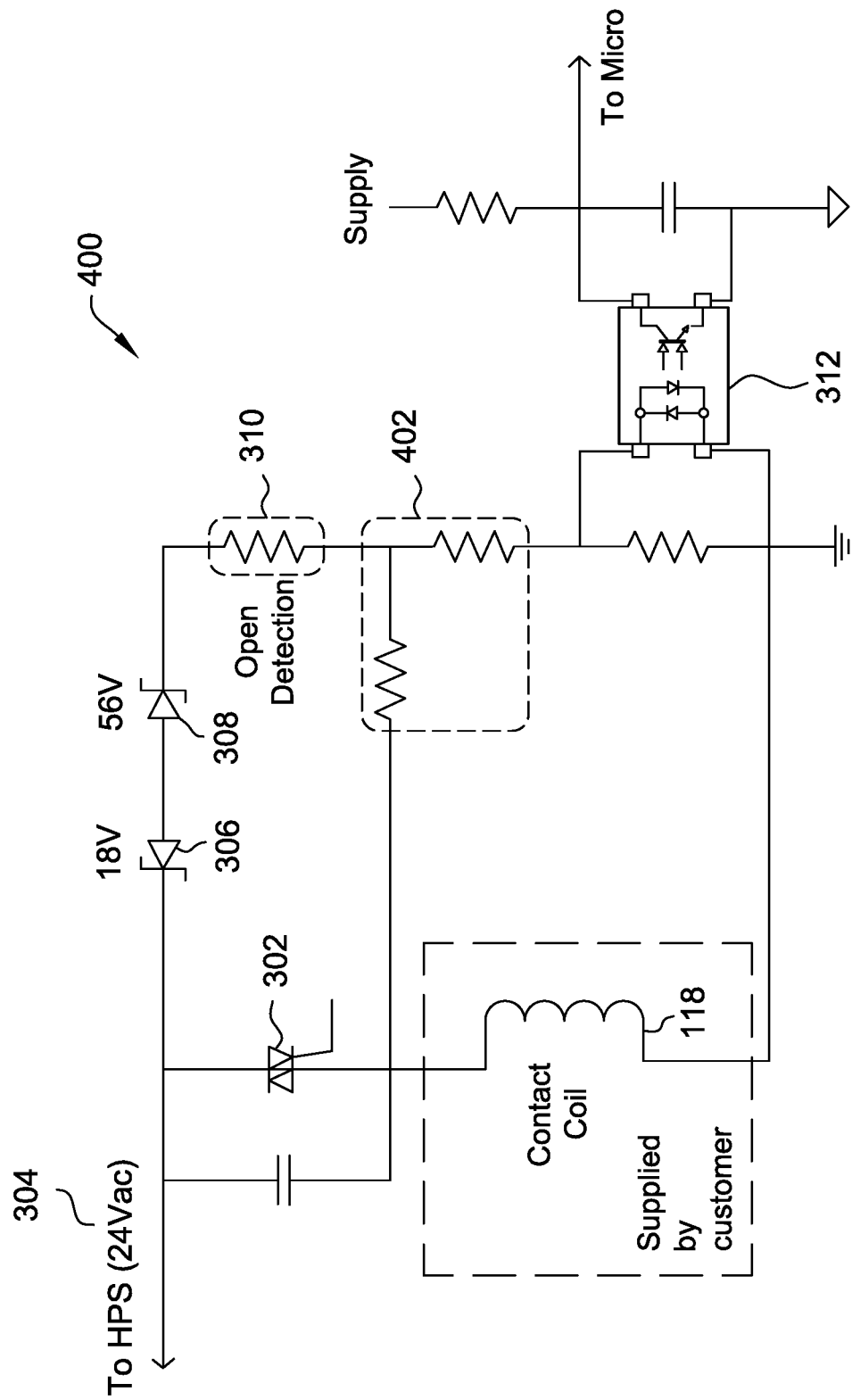
FIG. 4 is a schematic diagram of a coil control switch monitoring, in accordance with the present disclosure.

However, as described herein, an unintended energizing of the contactor coil 118 (e.g., due to shorted Triac switch 302) also needs to be monitored. FIG. 4 illustrates a schematic diagram 400 of a coil control switch according to some embodiments. The coil control switch shown in FIG. 4 may be similar to the coil control switch shown in FIG. 3 with an additional resistor network 402 added to the coil control switch as shown in FIG. 4. In some embodiments, the additional resistor network 402 may be connected with the coil control switch as shown in FIG. 4. When the Triac switch 302 fails (in other words unintentionally closes/shortens) causing the contactor coil 118 to get energized, an electric current may also flow through the additional resistor network 402 altering a signal generated by the optoisolator 312. Accordingly, the signal generated by the optoisolator 312 is of different waveform from the particular waveform that is generated under the normal conditions.

Accordingly, when the controller (not shown) detects that the optoisolator signal is different from the particular waveform under normal conditions when the controller has expected the signal to be of the particular waveform under normal conditions, the controller may determine that a fault has occurred in the coil control switch. Based on the fault detected in the coil control switch, the controller may take a preventive action to avoid damage to the inverter 114. As described herein, a single optoisolator (e.g., the optoisolator 312) is used to detect presence of the 24 Vac input 304 and an unintentionally shorted Triac switch 302. The signal generated by the optoisolator 312 to the controller is therefore affected (or in other words a waveform of the signal is altered) when there is a fault in the Triac switch 302 as shown in FIG. 5.

Figure 5:
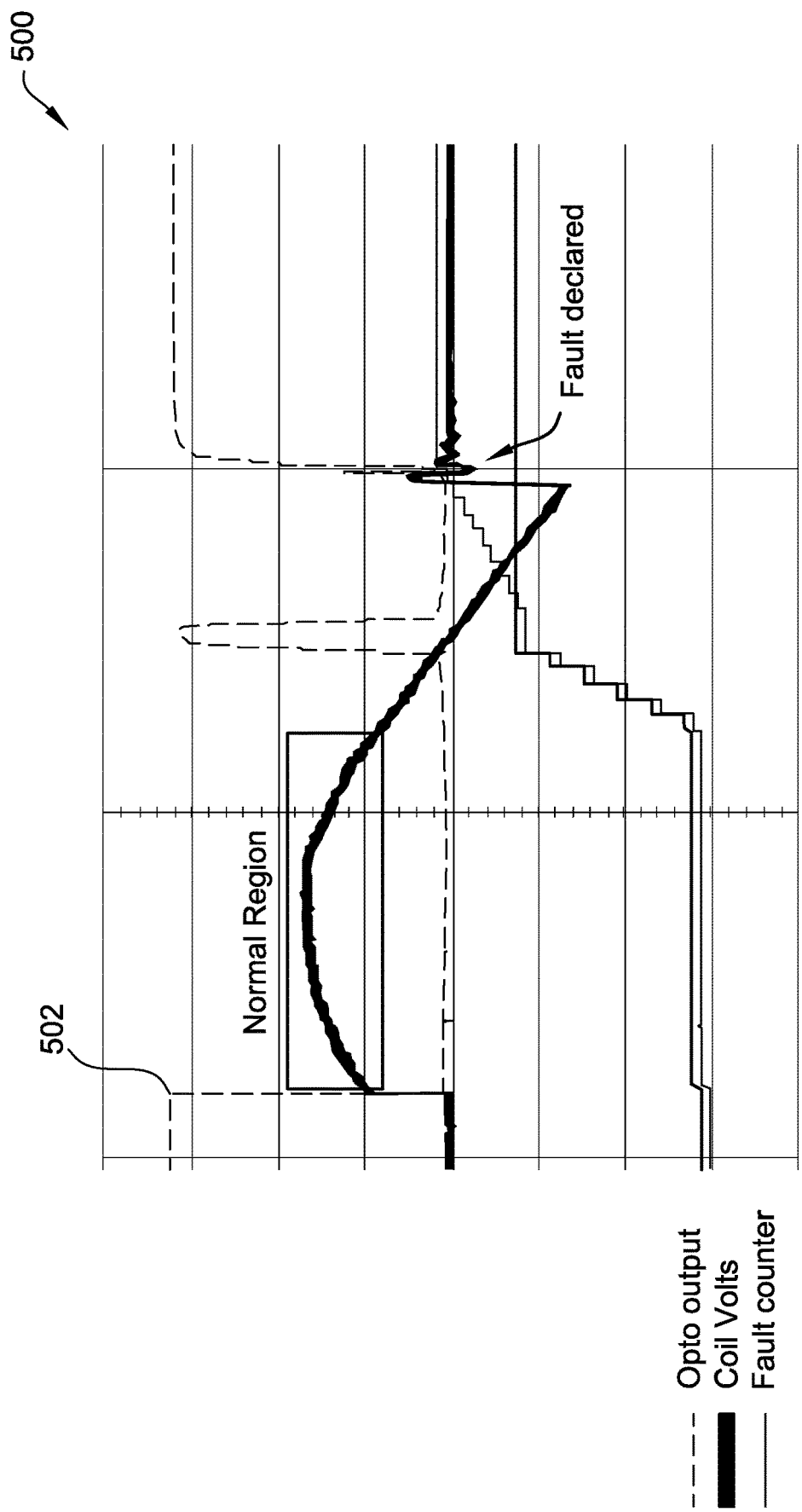
FIG. 5 is a chart of waveforms, in accordance with the present disclosure.

FIG. 5 illustrates a chart 500 in which a waveform 502 is a pulse waveform of a certain amplitude and a certain frequency that corresponds to a signal output of the optoisolator 312 under normal conditions. When there is a fault in the Triac switch 302, a signal output of the optoisolator may not be the regular pulse waveform but it may be similar to a waveform 502, which has characteristics different from the normal waveform (not shown) where the duty cycle of the pulse is different. Based on comparison of the characteristics of the waveforms 502 and the regular waveform, the controller may determine or detect a failure of the Triac switch 302.

Figure 6:
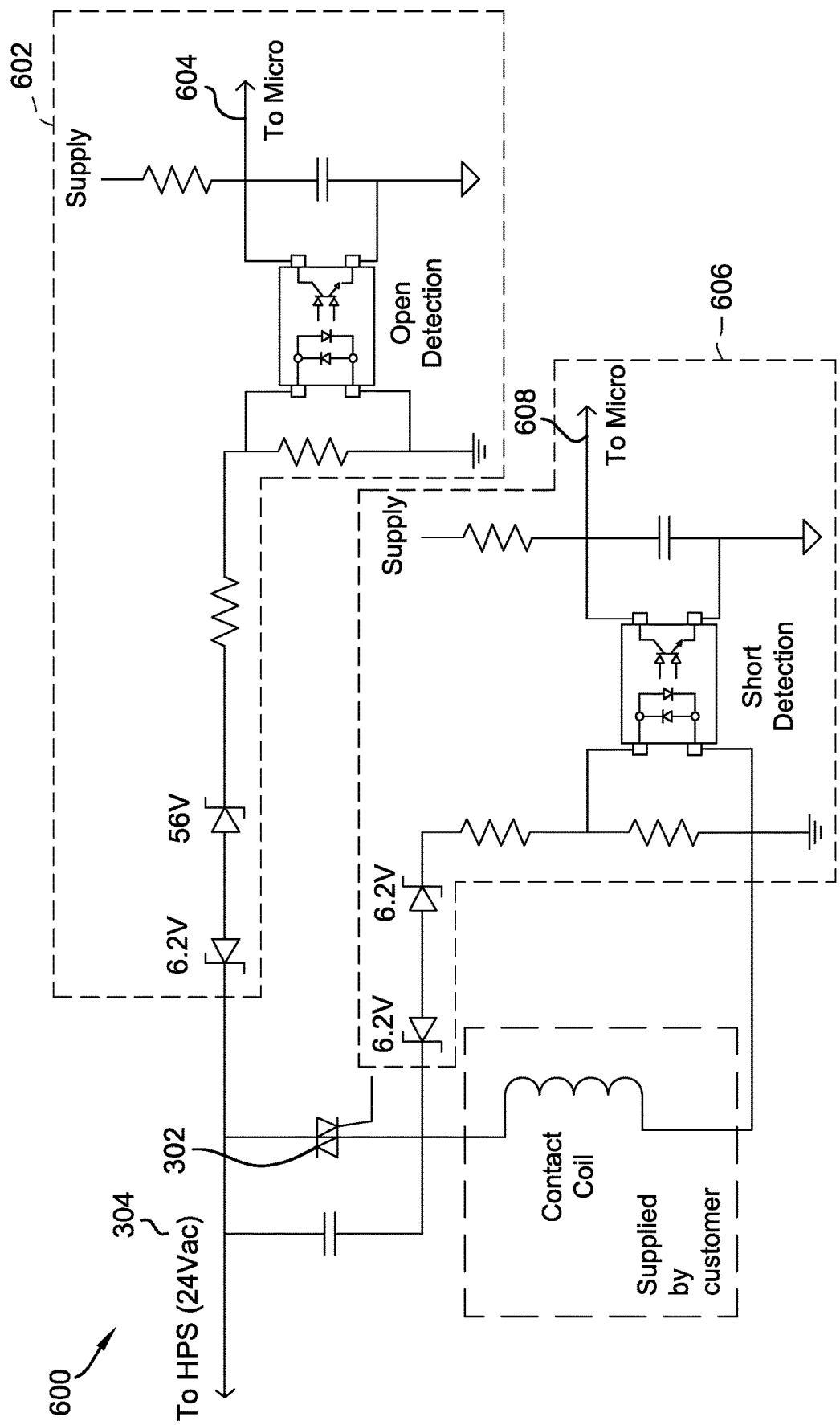
FIG. 6 is a schematic diagram of a coil control switch monitoring according to a first aspect described in the present disclosure.

FIG. 6 illustrates a schematic diagram 600 of a coil control switch according to some embodiments. The coil control switch shown in FIG. 6 may be similar to the coil control switch shown in FIG. 3, but may use different optoisolator circuits, for example, a first optoisolator circuit 602 to detect presence of the 24 Vac input 304 using an output signal 604 and a second optoisolator circuit 606 to detect an unintentionally closed/shorted Triac switch 302 using an output signal 608. Generally, the output signal 608 is absent when the Triac switch 302 is opened (or not closed/shorted). Accordingly, when the controller (not shown) has not closed/shorted the Triac switch 302 intentionally, present of the output signal 608 is indicative of a fault in the Triac switch 302. Upon detecting a fault in the Triac switch 302, the controller may take an action to prevent damage to the inverter 114. Using different optoisolator circuits to detect presence of the 24 Vac input 304 and to detect an unintentionally closed/shorted Triac switch 302 simplifies detection of a fault in the Triac switch 302 as it requires detection of only a presence of the output signal (indicating a fault in the Triac switch 302) or an absence of the output signal 608 (indicating no fault in the Triac switch 302). As stated herein, the first optoisolator circuit 602 and/or the second optoisolator circuit 604 may be circuitries separate from the coil control switch.

Alternatively, a fault in the Triac switch 302 may be determined without detecting a presence or an absence of an output signal from a separate optoisolator circuit as shown in FIG. 6 by using a circuitry, which is discussed using FIG. 7 and FIG. 9 below, that (artificially) generate a zero-crossing signal waveform, which is distinguishable from an output signal of an optoisolator (for example, the optoisolator of FIG. 4) generated under the normal conditions.

Figure 7:
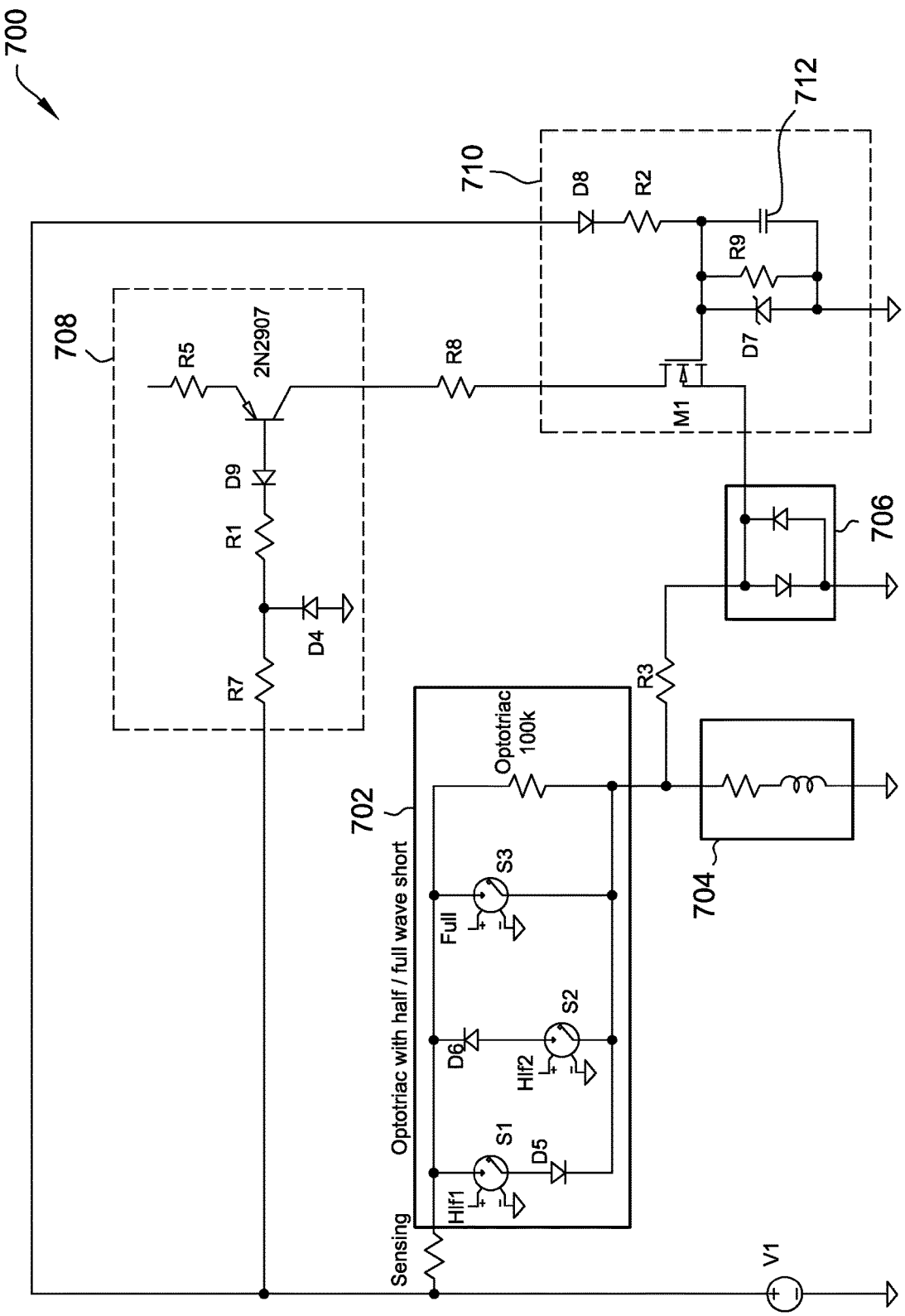
FIG. 7 is a schematic diagram of a coil control switch monitoring according to a second aspect described in the present disclosure.

FIG. 7 illustrates a schematic diagram 700 of a coil control switch according to some embodiments in which when a switch 702 is unintentionally closed and a coil 704 is energized, an output signal of an optocoupler 706 is phase shifted using circuit blocks 708 and 710, and in particular, using a delay capacitor 712.

Figure 8:
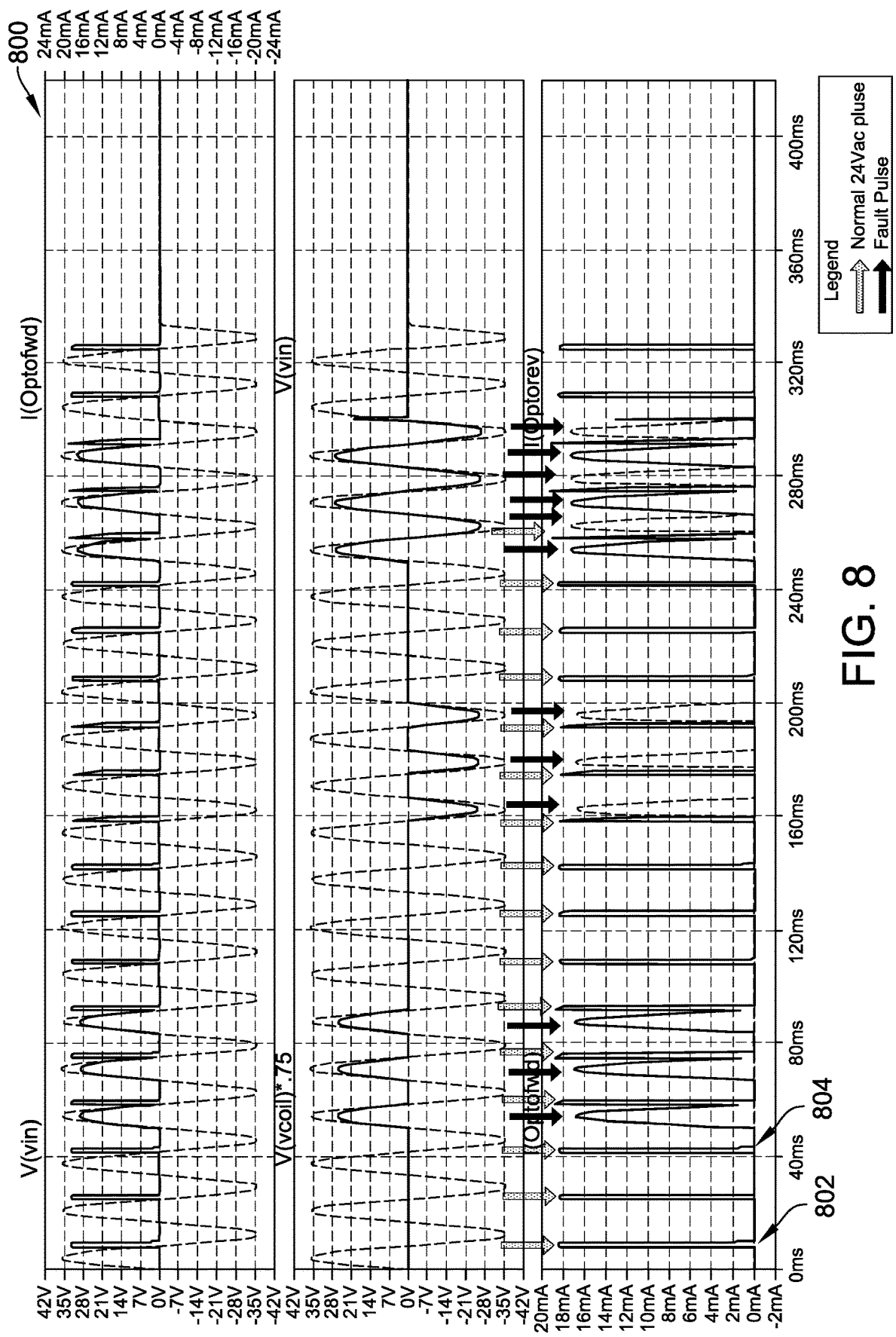
FIG. 8 is a chart of waveforms for the coil control switch shown in FIG. 7, in accordance with the present disclosure.

FIG. 8 illustrates a chart 800 in which a waveform 802 is a pulse waveform of a certain amplitude and a certain frequency that corresponds to a signal output of the optoisolator 706 under normal conditions. When there is a fault in the switch 702, a signal output of the optoisolator 706 is generated as phase shifted waveform 804, which also enables detection of a fault in the switch comparatively simple.

Figure 9:
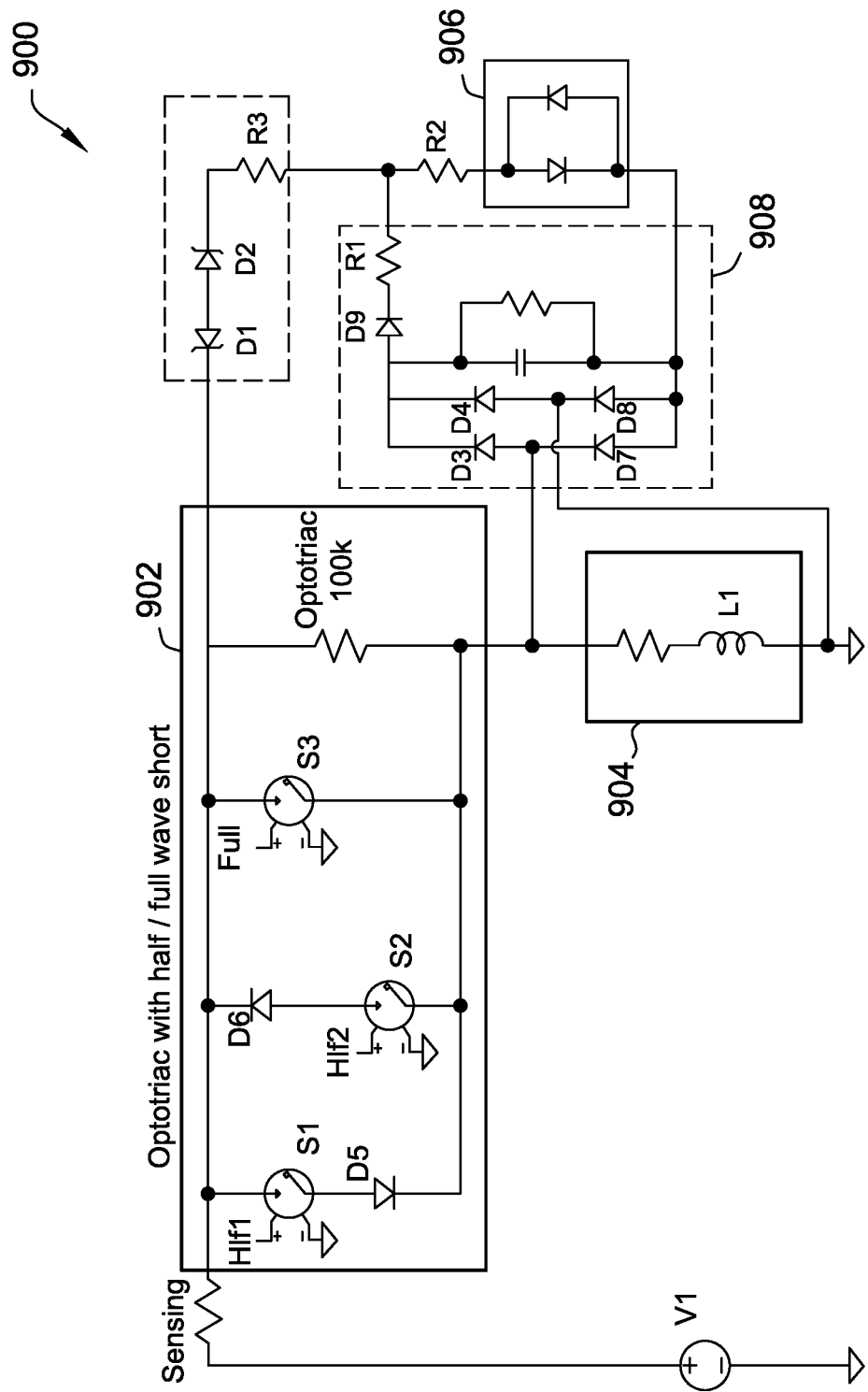
FIG. 9 is a schematic diagram of a coil control switch monitoring according to a third aspect described in the present disclosure.

FIG. 9 illustrates a schematic diagram 900 of a coil control switch according to some embodiments in which when a switch 902 is unintentionally closed and a coil 904 is energized, an output signal of an optocoupler 906 is varied in amplitude and phase using a circuit block 908.

Figure 10:
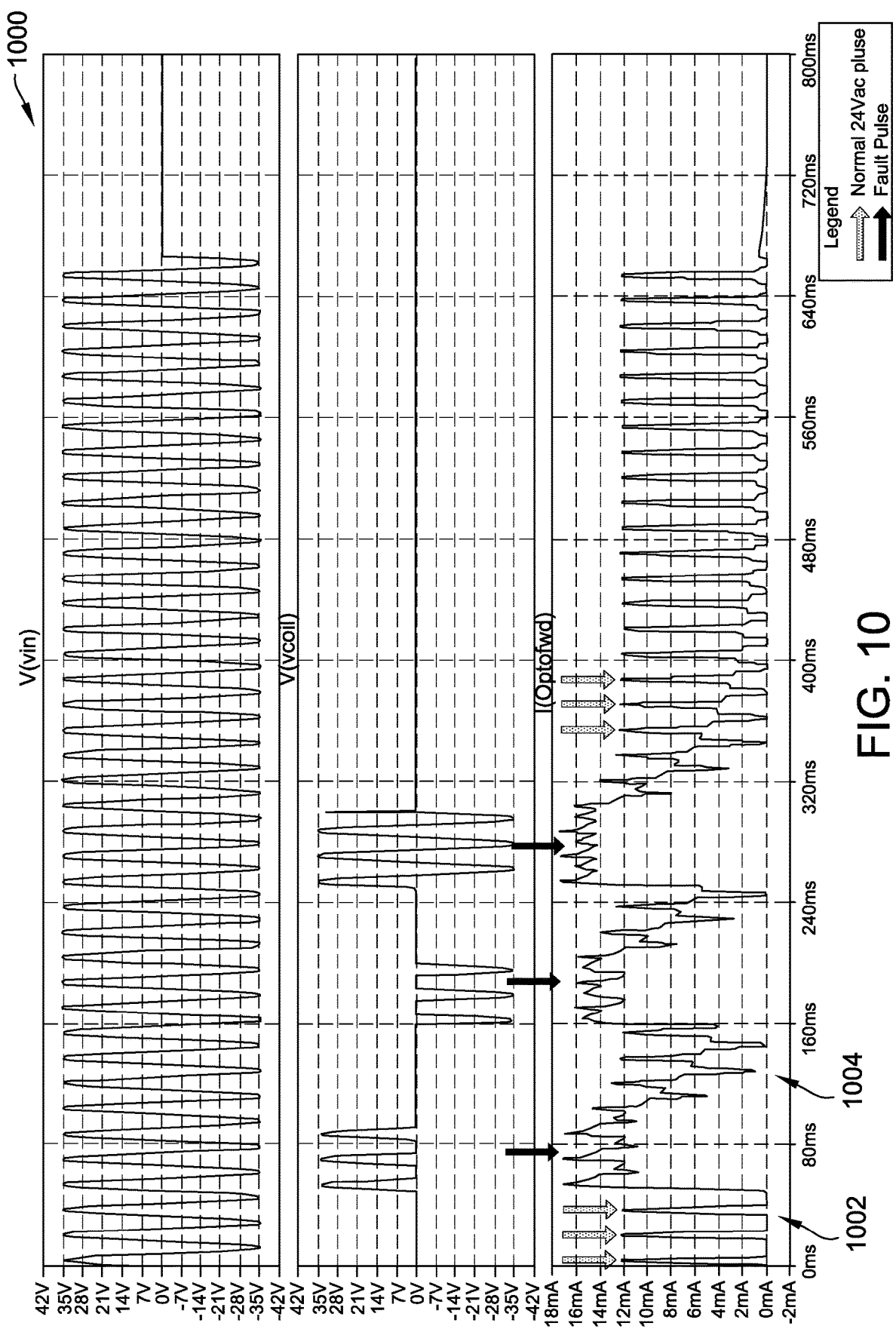
FIG. 10 is a chart of waveforms for the coil control switch monitoring shown in FIG. 9, in accordance with the present disclosure.

FIG. 10 illustrates a chart 100 in which a waveform 1002 is a pulse waveform of a certain amplitude and a certain frequency that corresponds to a signal output of the optoisolator 906 under normal conditions. When there is a fault in the switch 902, a signal output of the optoisolator 906 is generated as shown in FIG. 10 as 1004, which also enables detection of a fault in the switch comparatively simple.

In the present disclosure, the terms line frequency current, voltage, and/or power are used interchangeably herein to refer to direct electrical communication with an AC source.

Figure 11:
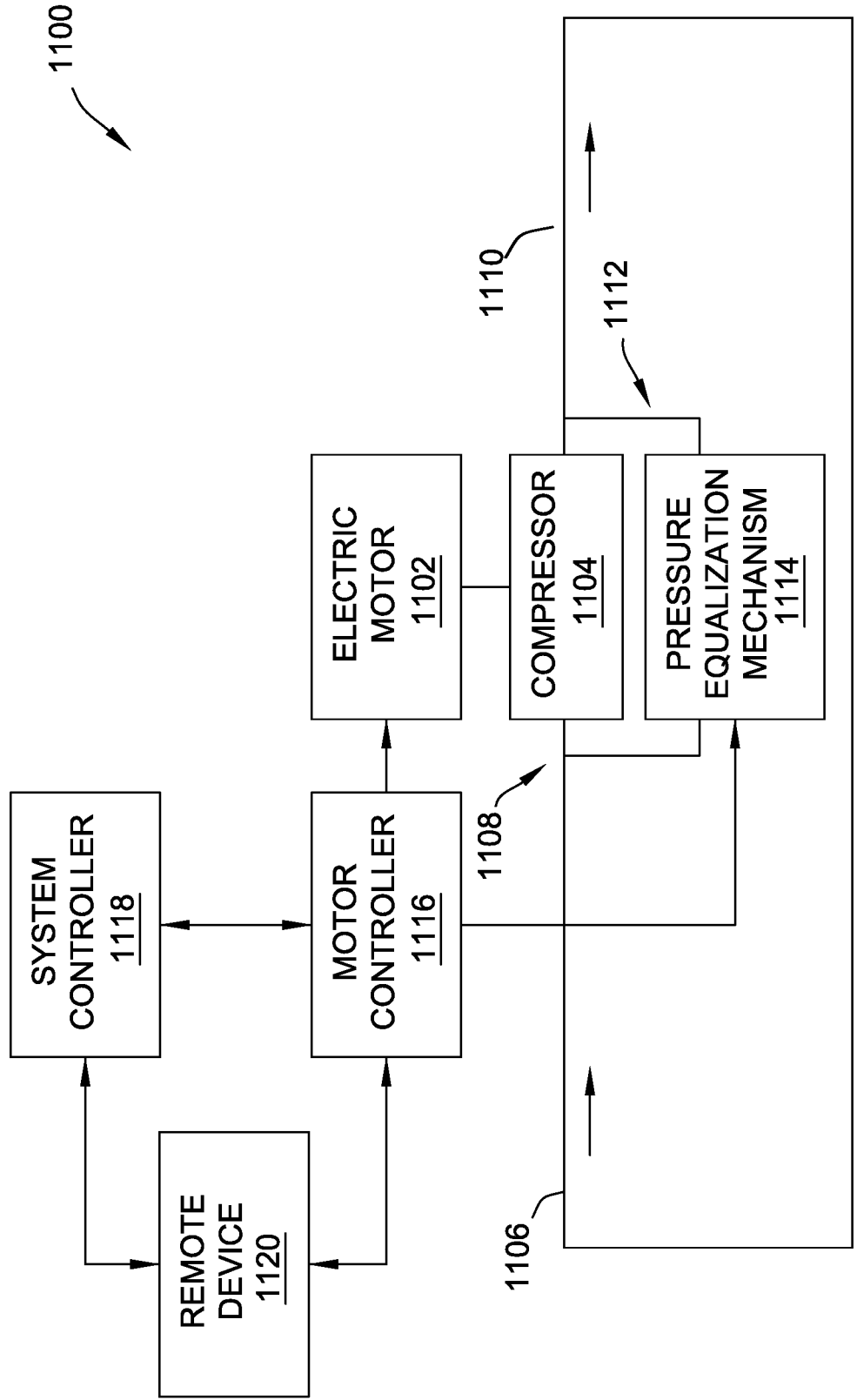
FIG. 11 is a block diagram of a control system for an electric motor in a compressor system.

FIG. 11 is a block diagram of an example compressor system 1100 including, for example, an electric motor 1102 mechanically coupled to a compressor 1104. Electric motor 1102 may include, for example, a PM motor or a PSC motor. For example, compressor system 1100 may be used with the electric motor and drive circuit shown in FIG. 1. In another example, compressor system 1100 may be used with the two-phase electric motor and drive circuit shown in FIGS. 2A, 2B, 3, 4, 6, 7, and/or 9.

Compressor 1104 is coupled with a fluid system 1106 such as a refrigerant system. Fluid system 1106 includes a suction portion 1108 and a discharge portion 1110 between which a pressure differential can develop during operation of compressor 1104. Pressure equalization mechanism 1114 may be incorporated internally or externally to compressor 1104.

Fluid system 1106 also includes a bypass fluid path 1112 in which a pressure equalization mechanism 1114 is positioned. Pressure equalization mechanism 1114 may include, for example, a pressure equalization valve coupled with the bypass fluid path 1112 and configured to at least partially reduce a pressure differential across compressor 1104, or between suction portion 1108 and discharge portion 1110.

Electric motor 1102 is controlled by a combination of a motor controller 1116, a system controller 1118, and, in certain embodiments, a remote device 1120. Motor controller 1116 includes, for example, power electronics and digital control components for rectifying line frequency power, supplying DC voltage, and inverting, or generating, variable frequency power that is supplied to the stator windings of electric motor 1102. Motor controller 1116 may further include control components for controlling operation of pressure equalization mechanism 1114, such as, for example, a microcontroller and one or more analog components for operating a solenoid to open and close, e.g., a pressure equalization valve. Alternatively, the control components of pressure equalization mechanism 1114 may be incorporated into system controller 1118, remote device 1120, or another device.

System controller 1118 communicates with motor controller 1116, for example, to transmit and receive commands or information from a user, and to perform system level control of compressor system 1100. System controller 1118 may include, for example, a thermostat.

Remote device 1120 may include a computing device such as a smart phone, a PC, tablet, server, or other computing system suitable for carrying out one or more control or user interface functions for compressor system 1100. Remote device 1120, system controller 1118, and motor controller 1116 communicate among each other in a wired or wireless manner using, for example, serial channel, CAN bus, Bluetooth, Wi-Fi, ZigBee, or any other suitable wired or wireless communication protocol. In certain embodiments, motor controller 1116, system controller 1118, and remote device 1120 may be incorporated into a single package with the electric motor 1102, or in a single package for the compressor system 1100. Motor controller 1116, system controller 1118, ore remote device 1120 may, in certain embodiments, be modularly packaged and positioned within the single package, or positioned separate from each other.

Some embodiments involve the use of one or more electronic or computing devices (e.g., for controlling operation of a drive circuit and/or individual components thereof). Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms: processor, processing device, and controller.

In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are examples only and are thus not limiting as to the types of memory usable for storage of a computer program.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   an electric motor, comprising:
     a switch configured to provide line frequency power to the electric motor to drive the electric motor at a full speed; and
     an inverter to provide variable frequency power to the electric motor to drive the electric motor at a variable speed; and
   a controller configured to:
     detect whether the switch is closed in response to powering up the electric motor and before supplying the variable frequency power to the electric motor from the inverter, wherein to detect whether the switch is closed, the controller is configured to:
       close at least one switch of an inverter leg connected with a motor winding of the electric motor; and
       determine that the switch is closed based on measuring or detecting flow of an electric current using at least one of a sensor placed in a current flow path in series with the switch or a sensor sensing current in a start winding leg of the inverter; and
     based on the detecting that the switch is closed, prevent supply of the variable frequency power to the electric motor from the inverter to prevent damage to the inverter.

2. The system of claim 1, wherein the switch includes:
   a two-pole switch having a first leg and a second leg, the first leg connected to a first terminal of the line frequency power and the second leg connected to a second terminal of the line frequency power; and
   a coil energized by closing a coil control switch of the controller to close the switch to provide the line frequency power to the electric motor to drive the electric motor at the full speed.

3. The system of claim 2, wherein the controller is further configured to generate an alert notification to notify a user of a fault in the switch.

4. The system of claim 2, wherein the controller is further configured to close the at least one switch of the inverter leg connected with the motor winding for a predetermined period not exceeding 2 seconds.

5. The system of claim 4, wherein the predetermined period is 1 second or 0.5 second.

6. The system of claim 2, further comprising:
a circuitry to detect presence of an alternating current (AC) voltage input using an output signal of a first waveform type; and
an impedance network to detect the output signal of a second waveform type, the second waveform type different from the first waveform type,
wherein the controller is further configured to determine whether the switch is closed while the inverter is supplying the variable frequency power to the electric motor by determining presence of the output signal of the second waveform type.

7. The system of claim 2, wherein to determine whether the switch is closed in response to powering up the electric motor and before supplying the variable frequency power to the electric motor from the inverter, the controller is further configured to:
measure or detect flow of the electric current using the sensor placed in a current flow path before the switch; and
based on detection of the electric current using the sensor, determine that both of the first leg and the second leg are shorted, and the switch is closed.

8. The system of claim 2, further comprising:
a circuitry to generate an output signal when the coil control switch is shorted,
wherein the controller is further configured to determine whether the switch is closed while the inverter is supplying the variable frequency power to the electric motor by determining presence of the output signal of the circuitry.

9. The system of claim 2, further comprising:
a circuitry configured to generate an output signal of a first waveform type in response to detecting presence of an alternating current (AC) voltage input and to generate an output signal of a second waveform type in response to detecting the coil control switch is shorted, the second waveform type is phase shifted waveform in comparison with the first waveform,
wherein the controller is further configured to determine whether the switch is closed while the inverter is supplying the variable frequency power to the electric motor by determining presence of the output signal of the second waveform type.

10. The system of claim 1, wherein the electric motor is a permanent split capacitor motor or a permanent magnet motor.

11. A controller of an electric motor configured to:
detect whether a switch of the electric motor is closed when the electric motor is powered up and before supplying variable frequency power of an inverter of the electric motor to drive the electric motor by detecting presence of an output signal that is generated when a coil control switch of the switch is shorted and the switch is closed; and
based on the detecting that the switch is closed, prevent supplying the variable frequency power to the electric motor from the inverter to prevent damage to the inverter.

12. The controller of claim 11, wherein to determine whether the switch is closed in response to powering up the electric motor and before supplying the variable frequency power to the electric motor from the inverter, the controller is further configured to:
measure or detect flow of an electric current using at least one of a sensor placed in a current flow path in series with the switch; and
based on detection of the electric current, determine that both of a first leg and a second leg of the switch are shorted and the switch is closed.

13. The controller of claim 11, wherein to determine whether the switch is closed in response to powering up the electric motor and before supplying the variable frequency power to the electric motor from the inverter, the controller is further configured to:
close at least one switch of an inverter leg connected with a start winding of the electric motor for a period not exceeding 2 seconds, 1 second, or 0.5 second;
measure or detect flow of an electric current using at least one of a sensor placed in a current flow path in series with the switch and a sensor sensing current in a third leg of the inverter; and
based on detection of the electric current, determine that at least one of a first leg or a second leg of the switch is shorted, and the switch is closed.

14. The controller of claim 11, further configured to determine whether the switch is closed while the inverter is supplying the variable frequency power to the electric motor by,
determining presence of a first output signal of a first waveform type corresponding presence of an alternating current (AC) voltage supply;
determining presence of a second output signal of a second waveform type, the first waveform type different from the first waveform type and corresponding to the coil control switch of the switch when the coil control switch is shorted; and
based on detection of presence of the first output signal and the second output signal, determining that the coil control switch is shorted, and the switch is closed.

15. The controller of claim 14, wherein the second output signal is a phase shifted signal in comparison with the first output signal.

16. A method to prevent cross conduction in an electric motor, the method comprising:
detecting whether a switch of the electric motor is closed when the electric motor is powered up and before supplying variable frequency power of an inverter of the electric motor to drive the electric motor by measuring or detecting flow of an electric current using at least one of a sensor placed in a current flow path in series with the switch or a sensor sensing current in a start winding leg of the inverter upon closing of at least one switch of the inverter in the start winding leg of the inverter;
based on the detecting that the switch is closed, preventing the inverter from supplying the variable frequency power to the electric motor;
based on the detecting that the switch is not closed:
causing the inverter to supply the variable frequency power to the electric motor;
monitoring a state corresponding to a coil control switch of the switch; and
based on the detecting that the state corresponding to the coil control switch of the switch indicating a shorted coil control switch, preventing the inverter from supplying the variable frequency power to the electric motor.

17. The method of claim 16, wherein the detecting whether the switch of the electric motor is closed when the electric motor is powered up and before supplying the variable frequency power of the inverter of the electric motor comprises:

measuring or detecting flow of the electric current using the sensor placed in the current flow path in series the switch; and based on detection of the electric current, determining that both of a first leg and a second leg of the switch are shorted and the switch is closed.

\* \* \* \* \*